United States Patent [19]

Bihler et al.

[11] Patent Number: 4,556,229
[45] Date of Patent: Dec. 3, 1985

[54] STAIR-CLIMBING APPARATUS FOR WHEELCHAIR

[75] Inventors: Franz Bihler; Anton Abele, both of Augsburg, Fed. Rep. of Germany

[73] Assignee: Kleindienst GmbH, Augsburg, Fed. Rep. of Germany

[21] Appl. No.: 511,791

[22] Filed: Jul. 7, 1983

[30] Foreign Application Priority Data

Jul. 9, 1982 [DE] Fed. Rep. of Germany ....... 3225680

[51] Int. Cl.$^4$ ........................... A61G 5/00; B62B 5/02; B62B 9/02; B62D 55/00
[52] U.S. Cl. .................................. 280/5.22; 180/8.2; 180/907; 280/289 WC; 280/DIG. 10; 410/7
[58] Field of Search ............... 280/5.22, 5.2, 289 WC, 280/242 WC, DIG. 10; 297/DIG. 4; 410/3–10; 180/8.2, 9.2 R, 907

[56] References Cited

U.S. PATENT DOCUMENTS 4,432,426 2/1984 Misawa ................... 280/242 WC

Primary Examiner—Joseph F. Peters, Jr.
Assistant Examiner—Mitchell J. Hill
Attorney, Agent, or Firm—Karl F. Ross; Herbert Dubno

[57] ABSTRACT

An apparatus for moving a wheelchair on a flight of steps has a support adapted to engage underneath the wheelchair in an upright condition of same with the chair pivotal on the support between erect and inclined positions. Two or more endless tracks on the support carry same and the wheelchair thereon so that the tracks allow the wheelchair to move over uneven terrain and up and down stairs. A latch is displaceable on the support between a holding position securing the wheelchair in the inclined position and a freeing position permitting the wheelchair to move freely between its positions. A safety device connected to the latch is responsive to the inclination of the tracks relative to the horizontal for blocking the latch from moving into the freeing position when the tracks are inclined at more than a predetermined angle to the horizontal. Thus the wheelchair cannot be released from the support when same is moving on an incline. The latch is provided with a pedal to displace it into the freeing position. The support includes a frame element pivotal on the support about a horizontal axis transverse to the tracks and a device for securing the frame element to the wheelchair on the support.

10 Claims, 5 Drawing Figures

STAIR-CLIMBING APPARATUS FOR WHEELCHAIR

FIELD OF THE INVENTION

The present invention relates to an apparatus for moving a load support on an incline. More particularly this invention concerns an apparatus that allows a wheelchair to climb, that is ascend and descend, stairs.

BACKGROUND OF THE INVENTION

A standard stair climber for a wheelchair, stretcher, or the like has a support adapted to engage underneath the wheelchair in an upright condition of same with the wheelchair pivotal on the support between erect and inclined positions. The wheelchair is moved onto this support at the top or bottom of the incline or flight of stairs. Two endless tracks carry the support and wheelchair thereon so the wheelchair can move over uneven terrain and up and down stairs.

In order to move on an incline it is necessary to tip the wheelchair back into the inclined position, as otherwise the assembly would overbalance forward, presuming that the chair is facing down the incline. A latch on the support is displaceable between a holding position securing the wheelchair in the inclined position and a freeing position permitting the wheelchair to move freely between its positions. This latch is typically operated by a foot lever or pedal.

Although the latch is made as robust as impossible, it is not impossible for the pedal to be depressed accidentally. This can happen when an attendant who is rolling the chair on the level is following too closely or guiding the stair-climbing apparatus. Such actuation can open the latch, allowing the wheelchair to tip forward and dump out the disabled person in it, with the obvious risks.

OBJECTS OF THE INVENTION

It is therefore an object of the present invention to provide an improved incline-climbing apparatus for a wheelchair or the like.

Another object is the provision of such a incline-climbing apparatus for a wheelchair or the like which overcomes the above-given disadvantages, that is which cannot release the wheelchair except when on the level.

SUMMARY OF THE INVENTION

An apparatus for moving a wheelchair on a flight of steps according to the invention has a support adapted to engage underneath the wheelchair in an upright condition of same with the chair pivotal on the support between erect and inclined positions. Two or more endless tracks on the support carry same and the wheelchair thereon so that the tracks allow the wheelchair to move over uneven terrain and up and down stairs. A latch is displaceable on the support between a holding position securing the wheelchair in the inclined position and a freeing position permitting the wheelchair to move freely between its positions. A safety device connected to the latch is responsive to the inclination of the tracks relative to the horizontal for blocking the latch from moving into the freeing position when the tracks are inclined at more than a predetermined angle to the horizontal. Thus the wheelchair cannot be released from the support when same is moving on an incline.

According to another feature of this invention the latch is provided with a pedal to displace it into the freeing position to release the chair. In addition the support includes a frame element pivotal on the support about a horizontal axis transverse to the tracks and means for securing the frame element to the wheelchair on the support. A spring is connected between the support and the latch mechanism for urging same into the holding position.

The latch of the instant invention has a latch arm pivotal on the support between the latch positions and operatively connected to the wheelchair on the support, a pivot spaced on the support a fixed radial distance from the pivot axis of the latch arm, a weight eccentric to and pivoted on the pivot, and a retaining dog fixed to the weight and latchingly engageable with the latch arm. The weight and dog are relatively positioned such that when the support and tracks are inclined at more than a predetermined angle to the horizontal the dog latchingly engages and arrests the latch arm.

In one system according to this invention the latch arm is formed with a cutout open radially outward relative to the latch-arm pivot axis and the dog has a tip engageable in the cutout to rotationally arrest the latch arm. Furthermore the dog is a two-arm lever centrally mounted on the pivot and having one arm provided with the tip and another arm carrying the weight.

It is also possible for the dog to have a projection engageable with the latch arm in the holding position of same and in the inclined position of the tracks to prevent pivoting of the latch arm into the opening position. Either way the system includes stops that limit pivoting of the dog to a small arc relative to its pivot.

Thus with the system according to the present invention the latch cannot be opened when the wheelchair is tipped. This makes it impossible, even in an accident, to release the chair and the disabled person thereon. This extra level of safety is particularly important to a person who cannot presumably aid him or herself.

The wheelchair of the instant invention could also, of course, be replaced by any other type of load carrier which is carried on a stair climber or similar piece of equipment. For instance a food or supply cart could be used instead of a wheelchair.

In addition, as described in our jointly filed and copending application Ser. No. 511,790 the stair climber could have an adjustment spindle extending along and rotatable about a horizontal axis through the mount ends adjacent the frame member and having oppositely threaded ends at the outer ends engaged in respective mounting blocks axially slidable in the outer mount ends and threaded on the adjustment-spindle ends. Thus rotation of the spindle in one direction about its axis moves the two blocks axially apart and opposite rotation moves them axially together. The mounting blocks are formed to fit with the respective wheelchair frame members so that the blocks can be moved together and apart by means of the spindle to fit to chairs of different sizes. Respective clips are pivotal on the blocks between holding positions securing the respective wheelchair frame members in the respective seats and releasing positions out of engagement with the respective wheelchair frame members. Means is also provided on this arrangement for arresting the transverse mount at any of a plurality of vertically offset locations along the frame element.

DESCRIPTION OF THE DRAWING

The above and other features and advantages will become more readily apparent from the following, reference being made to the accompanying drawing in which.

SPECIFIC DESCRIPTION

Figure 1:
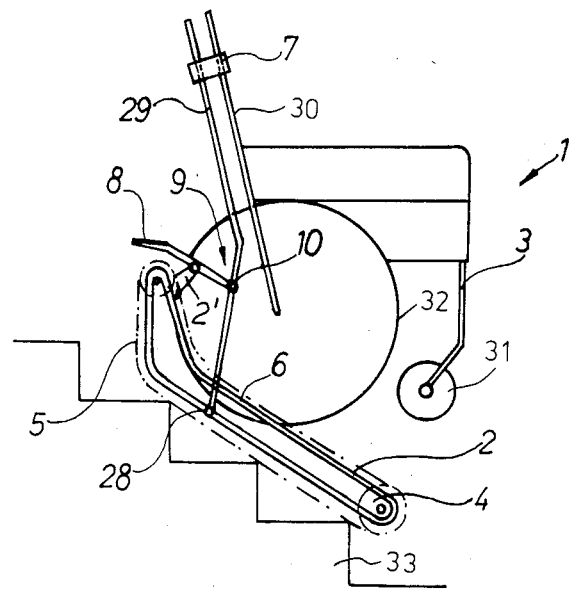
FIG. 1 is a simplified side view illustrating the apparatus of this invention.

As seen in FIG. 1 a wheelchair 1 has a frame 3 and can be carried on an L-shaped support 2 carried in turn on a pair of endless tracks or chains 5 that are driven by means of a motor 4. The support 2 is formed as a guide 6 for the wheels 31 and 32 of the chair 1, normally with front-to-back grooves extending parallel to the plane of the view of FIG. 1.

Pivoted on the support 2 at a horizontal axis 28 is a frame member 29 that can be secured to a frame member 30 of the chair 1 by a coupling 7 described in more detail in our above-mentioned application. A latch 9 pivotally mounted on support 2 by a strut 2' has a latch arm 10 that is actuated by a pedal 8 and that can hook over the member 29 to secure same in a position corresponding to the tipped-back position of the wheelchair 1 shown in FIG. 1.

In use, as is known, the wheelchair 1 is backed up on the guide 6 of the support 2 so that the front wheels 31 and rear wheels 32 of the chair 1 sit thereon. This is done at the top or bottom of a flight of stairs 33. The couplings 7 are then engaged to lock the frame members 30 to the members 29.

To climb the stairs the chair 1 is then tipped back on its rear wheels 32 into the FIG. 1 position and the latch 9 is engaged to hold it in this tipped-back position, in which the entire system is stable both on the level and inclined as shown in FIG. 1. The support 2 can then climb the stairs by means of the tracks 5 driven by the motor 4.

Figure 2:
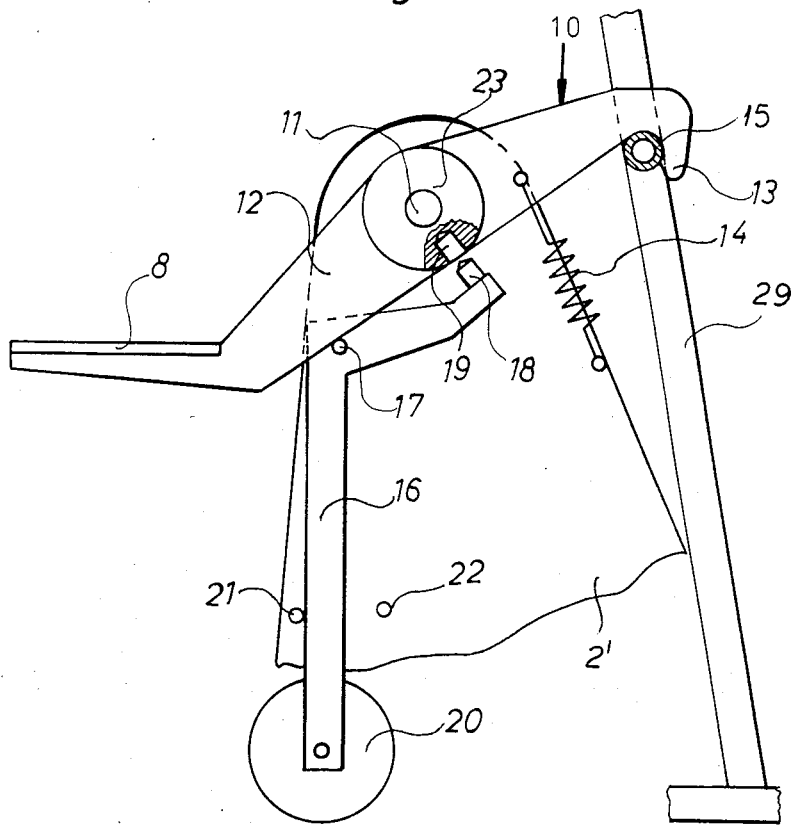
FIG. 2 is a large-scale view of a detail of the latch of the apparatus, shown in the horizontal latched position.
Figure 3:
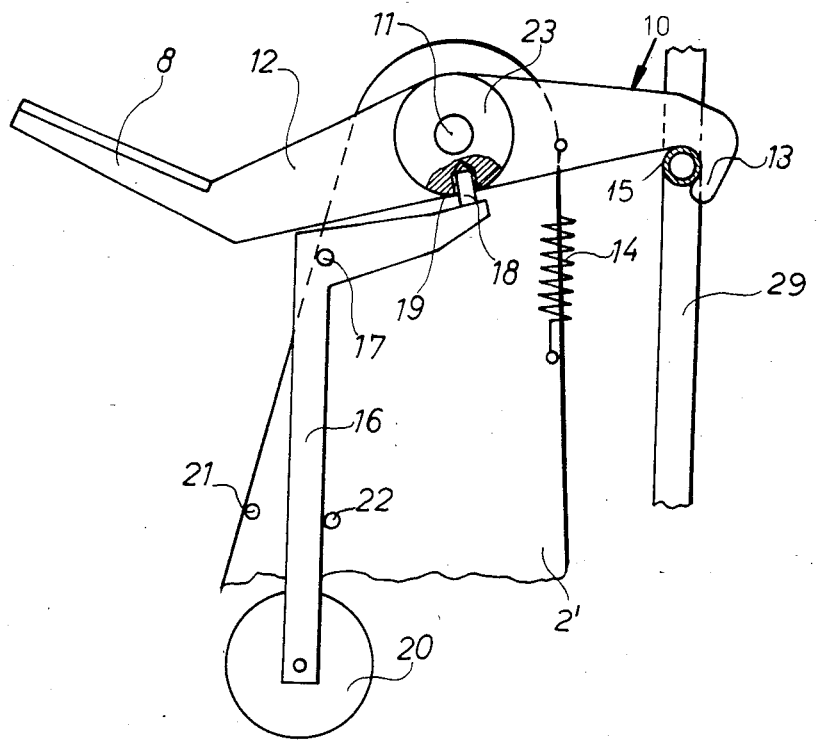
FIG. 3 is a view like FIG. 2 but showing the latch in the tipped, latched, and secured position.

According to this invention and as shown in FIGS. 2 and 3 the latch arm 10 is formed as a two-arm lever pivoted on the frame 2 at a horizontal pivot 11 mounted on the strut 2' above and parallel to the pivot 28. One end of the arm 10 is formed with a hook 13 that can engage over a member 15 that can be part of the member 29 or of the wheelchair frame 3. The other end 12 is provided with the pedal 8. A tension spring 14 pivots the latch arm 10 clockwise in the drawing into a position with its end 13 hooked over the member 15 and effectively holding same in the tipped position of the wheelchair.

In addition this latch arm 10 has a hub 23 formed with a bore 19 open radially of the pivot 11. A safety latching dog 16 pivoted about an axis 17 parallel to but below the axis 17 of pivot 11 has a tip 18 engageable radially in this bore 19 in the latched position and is also formed as a two-arm lever whose other arm is provided with a counterweight 20. Stops 21 and 22 on the strut 2' limit angular movement of the latch dog.

The relative positions and dimensions of the parts are such that, when the support 2 moves from the horizontal position of FIG. 2 to the tipped position of FIG. 3 the tip 18 engages in the cutout or bore 19 and rotationally arrests the latch arm 10. Thus once this arm 10 is latched and the support 2 is tipped, the chair 1 cannot be released until the support 2 is back on the level. This makes it impossible to accidentally actuate the pedal 8 and dump out the disabled person from his or her chair 1.

The hook tip 13 of the lever 10 is normally beveled so it can be deflected up as the chair 3 is swung back into the inclined position. In addition if the latch arm 10 is in the freeing position while the dog 16 moves into the securing position, the projection 18 will merely ride on the surface of the hub 23 until the hole 19 aligns with it.

Figures 4, 5:
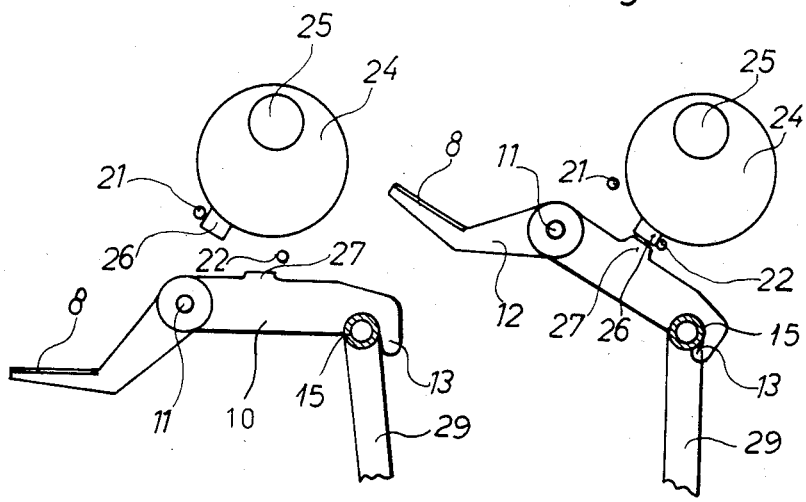
FIGS. 4 and 5 are views like FIGS. 2 and 3, respectively, but to smaller scale and of a variation on the system of this invention.

It is also possible as seen in FIGS. 4 and 5 to provide the arm 10 with a bump 27 engageable with another formation 26 extending radially from a pivot 25 of an eccentic counterweight disk 24. This disk 24 therefore moves between the angularly offset positions of FIGS. 4 and 5 when the frame is tipped from the level to the inclined position. In the tipped position of FIG. 5 the two formations 26 and 27 are directly juxtaposed so that pivoting of the latch arm 10 into the open position is impossible.

Other arrangements, such as for example using a sliding detent, are also impossible.

With the system according to this invention, therefore, the chair 1 cannot be released once the support it is on is tipped. This therefore completely obviates the possibility of releasing a disabled person and his or her wheelchair while negotiating steps or another incline. Since the system works automatically and responds purely to the position of the frame 2 relative to the horizontal, it can be counted on to provide an extra level of safety under all circumstances.

We claim:

1. An apparatus for moving a wheelchair on a flight of steps, the apparatus comprising:
   - a support adapted to engage underneath the wheelchair in an upright condition of same, the wheelchair being pivotal on the support between erect and inclined positions;
   - two endless tracks on the support and supporting same and the wheelchair carried thereon, whereby the tracks allow the wheelchair to move over uneven terrain and on stairs;
   - latch means on the support including a latch element displaceable between a holding position for securing the wheelchair in the inclined position and a freeing position for permitting the wheelchair to move freely between its positions; and
   - means connected to the latch element, responsive to the inclination of the tracks relative to the horizontal, and having a retaining dog movable into a position directly juxtaposed with the latch element for rotationally blocking the latch element from moving into the freeing position when the forward end of the tracks are inclined downwardly at more than a predetermined angle to the horizontal, whereby the wheelchair cannot be released from the support when same is moving on an incline.

2. The wheelchair-moving apparatus defined in claim 1 wherein the latch means is provided with a pedal to displace the latch element into the freeing position.

3. The wheelchair-moving apparatus defined in claim 1 wherein the support includes:
   - a frame element pivotal on the support about a horizontal axis transverse to the tracks; and a coupling element on the frame element for securing the frame element to the wheelchair and thereby securing the wheelchair to the support.

4. The wheelchair-moving apparatus defined in claim 1, further comprising spring means connected between the support and the latch elements for urging same into the holding position.

5. The wheelchair-moving apparatus defined in claim 1 wherein the latch element is pivotal on the support about a respective latch axis between the latch positions and is operatively connected to the wheelchair on the support.

6. The wheelchair-moving apparatus defined in claim 5 wherein the latch means includes a pivot spaced on the support a fixed radial distance from the latch axis; and a weight eccentric to and pivoted on the pivot, the retaining dog being fixed to the weight and latchingly engageable with the latch element when directly juxtaposed therewith, the weight and dog being relatively positioned such that when the support and tracks are inclined at more than a predetermined angle to the horizontal the dog latchingly engages and arrests the latch element.

7. The wheelchair-moving apparatus defined in claim 6 wherein the latch element is formed with a cutout open radially outward relative to the latch axis, the dog being engageable in the cutout to rotationally arrest the latch element.

8. The wheelchair-moving apparatus defined in claim 7 wherein the dog is a two-arm lever centrally mounted on the pivot and having one arm provided with the tip and another arm carrying the weight.

9. The wheelchair-moving apparatus defined in claim 6 wherein the dog has a projection engageable with the latch element in the holding position of same and in the inclined position of the tracks to prevent pivoting of the latch element into the opening position.

10. An apparatus for moving a wheelchair on a flight of steps, the apparatus comprising:

a support adapted to engage underneath the wheelchair in an upright condition of same, the wheelchair being pivotal on the support between erect and inclined positions;

two endless tracks on the support and supporting same and the wheelchair carried thereon, whereby the tracks allow the wheelchair to move over uneven terrain and on stairs;

a frame element pivotal on the support about a horizontal axis transverse to the tracks;

a coupling element on the frame element for securing same to the wheelchair and thereby securing the wheelchair to the support;

latch means on the support including a latch element displaceable between a holding position for securing the wheelchair in the inclined position and a freeing position for permitting the wheelchair to move freely between its positions, the latch element being pivotal on the support about a latch axis between the latch positions and being operatively connected to the frame element;

means connected to the latch element, responsive to the inclination of the tracks relative to the horizontal, and including a retaining dog movable into a position directly juxtaposed with the latch element a pivot spaced on the support a fixed radial distance from the latch axis, and a weight eccentric to and pivoted on the pivot, the retaining dog being fixed to the weight and latchingly engageable with the latch element when directly juxtaposed therewith, the weight and dog being relatively positioned such that when the forward end of the support and tracks are inclined downwardly at more than a predetermined angle to the horizontal the dog latchingly engages and rotationally arrests the latch element for blocking the latch element from moving into the freeing position when the tracks are inclined at more than a predetermined angle to the horizontal, whereby the wheelchair cannot be released from the support when same is moving on an incline; and stop means limiting pivoting of the dog to a small arc relative to its pivot.

* * * * *